A. BROOKER.
VEHICLE WHEEL.
APPLICATION FILED JUNE 13, 1910.

1,002,638. Patented Sept. 5, 1911.

WITNESSES:
George Bambay
H. Whiting

INVENTOR
Albert Brooker
BY Munn & Co.
ATTORNEYS

UNITED STATES PATENT OFFICE.

ALBERT BROOKER, OF LANCASTER, WISCONSIN.

VEHICLE-WHEEL.

1,002,638.

Specification of Letters Patent.

Patented Sept. 5, 1911.

Application filed June 13, 1910. Serial No. 566,584.

*To all whom it may concern:*

Be it known that I, ALBERT BROOKER, a citizen of the United States, and a resident of Lancaster, in the county of Grant and State of Wisconsin, have invented a new and Improved Vehicle-Wheel, of which the following is a full, clear, and exact description.

This invention relates to improvements in automobile wheels, and particularly to the tire therefor, whereby an increased durable resiliency is obtained.

An object of this invention is to provide a tire composed of a plurality of resilient members, preferably of a metallic nature, spaced apart and connected together to form a continuous resilient element.

A further object of this invention is to provide a device which will be simple in construction, inexpensive to manufacture, strong, durable, resilient, and both positive and noiseless in its operation.

These and further objects, together with the construction and combination of parts, will be more fully described hereinafter and particularly set forth in the claims.

Reference is to be had to the accompanying drawings forming a part of this specification, in which similar characters of reference indicate corresponding parts in all the views, and in which—

Figure 1:
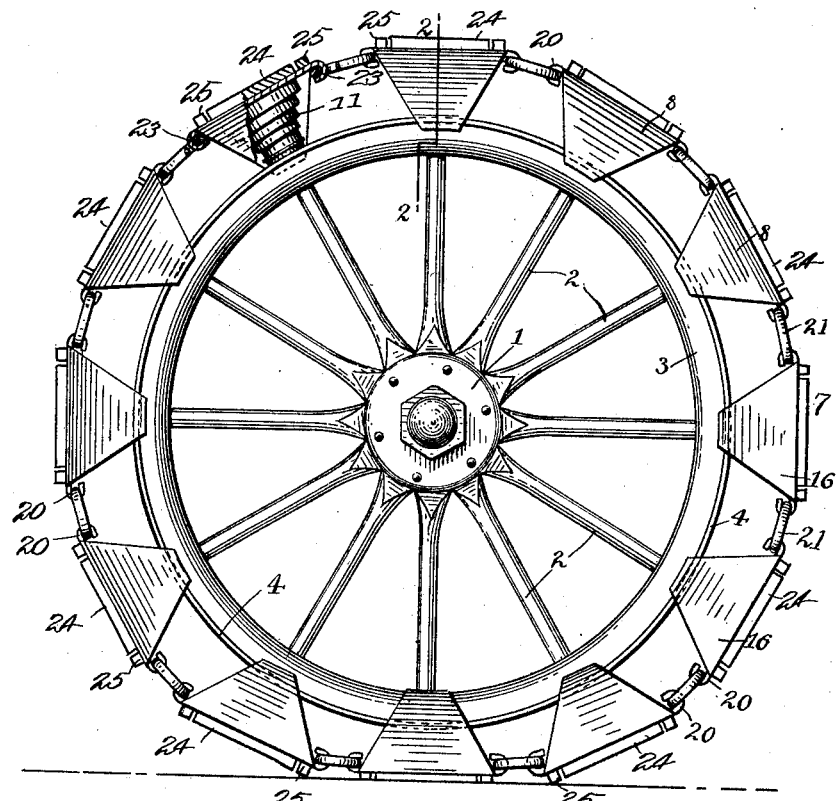
Figure 3:
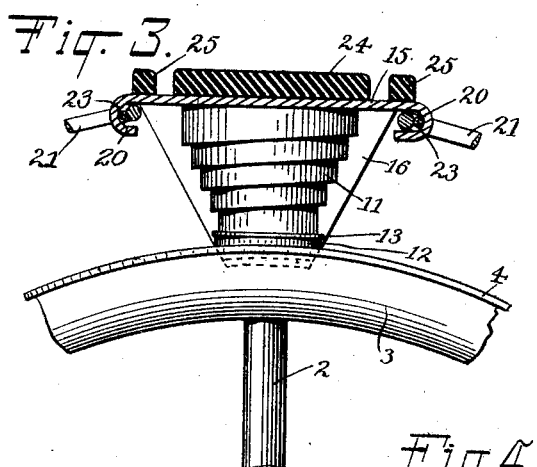
Figure 4:
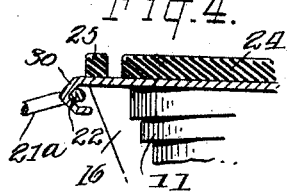
Figure 2:
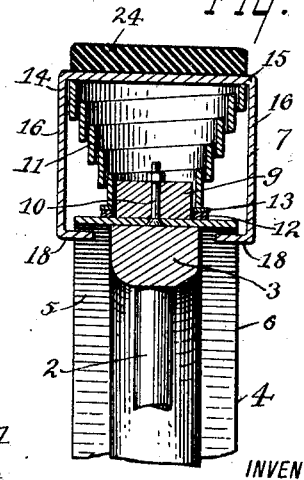

Figure 1 is a side view in elevation, partly broken away to show the underlying structure; Fig. 2 is a vertical section on the line 2—2 of Fig. 1; Fig. 3 is an enlarged fragmentary view in elevation, partly in section, and Fig. 4 is a fragmentary view in elevation, partly in section, showing a modified form of connection.

Referring more particularly to the separate parts of the device, 1 indicates a hub, from which radiate spokes 2 of any suitable form and material, the outer ends of the latter being connected by means of a felly 3 of any suitable form and material. Encircling the felly 3, there may be provided a rim 4, preferably of a suitable metal, and also preferably projecting beyond the sides of the felly 3, so as to form flanges 5 and 6, for a purpose to be described hereinafter. These members just mentioned form together the body of the wheel, for which I have provided a new and improved resilient tire 7. This tire 7 consists of a plurality of flat tread members 8, movably connected to the body of the wheel and movably connected to each other, so as to form a continuous circular element.

In order to hold the members 8 in proper spaced relation on the body of the wheel, there are provided at suitable intervals, lugs 9, which are secured in any well known manner to the body of the wheel, as by means of bolts 10. Each of these lugs 9 extends up into the innermost convolutions of a spiral telescopic spring 11, each successive coil of which is sufficiently larger than the coil preceding so as to surround the same and be capable of movement relative thereto in a vertical direction.

In order to prevent excessive rattling of the springs, when in use, there is provided for each of them a spaced member 12, in the nature of a washer, composed of a sound-deadening material, such as fiber, which is spaced apart from the face of the spring by means of a suitable metallic washer 13, the latter being adapted to take up the wear. The outer coil of each spring holds in spaced relation from the rim 4, a housing 14, which comprises a flat tread 15, sides 16, and inwardly-extending flanges 18 formed on the sides, which limit the outward and the lateral movement of the housing by engagement with the flanges 5 and 6. The housing is provided on opposite ends of the tread with hooks 20, which are engaged by suitable connecting links 21, which connect each housing with the next adjacent housing, thereby forming the continuous tire 7.

It will be noted by reference to Figs. 3 and 4 that two methods of connecting the housing are shown. In the form shown in Fig. 4, the hook of the housing, indicated at 30, is somewhat V-shaped, so as to form a convenient anti-friction bearing for a wedge portion 22 of a link 21ª corresponding to the link 21.

In the other form shown in Fig. 3, the hook 20 is shown as being semicylindrical and having a cylindrical rod or roller 23, interposed between the cylindrical ends of the link 21 and the hook 20, so as to form an anti-friction roller bearing between the housing and the link. In addition to these forms, any other suitable form of connection may be used. The tread may be provided with a rubber pad 24, secured thereto in any well-known manner, and with calks 25 of any suitable material.

It will thus be seen that there is provided an automobile wheel having a resilient tire of an exceedingly strong and durable nature, which will yield to the various uneven places in the road, without danger of derangement, and with little or no noise.

While I have shown embodiments of my invention, I do not wish to be limited to the specific details thereof, but desire to be protected in various changes, modifications and alterations which come within the scope of the appended claims.

Having thus described my invention, I claim as new and desire to secure by Letters Patent:—

1. In an automobile wheel, the combination with a body portion, of housings movably connected to said body portion, said housings comprising sides and a tread, hooks secured to each end of said tread, springs interposed between said housings and said body portion, and links, having antifriction connections with said hooks, adapted to connect said housings together in a continuous circular element.

2. In an automobile wheel, the combination with a hub, of spokes connected to said hub, a felly connected to said spokes, a rim connected to said felly and extending beyond the sides thereof, housings arranged in spaced relation around said rim, each of said housings comprising a flat tread, sides connected to said tread, flanges connected to said sides and extending inwardly and adapted to engage said rim, whereby the outward and lateral movement of said housings is limited, lugs secured to said rim in spaced relation, springs engaging said lugs and adapted to hold said housings resiliently away from said rim, hooks on said housings, and links, having anti-friction connection with said hooks, whereby said housings are connected together in a continuous flexible element.

In testimony whereof I have signed my name to this specification in the presence of two subscribing witnesses.

ALBERT BROOKER.

Witnesses:
S. H. TAYLOR,
A. O. MOSHER.

---

Copies of this patent may be obtained for five cents each, by addressing the "Commissioner of Patents, Washington, D. C."